May 17, 1932. H. D. SCHROEDER ET AL 1,858,525
DOOR LATCH OR LOCK
Filed Sept. 11, 1928  7 Sheets-Sheet 1
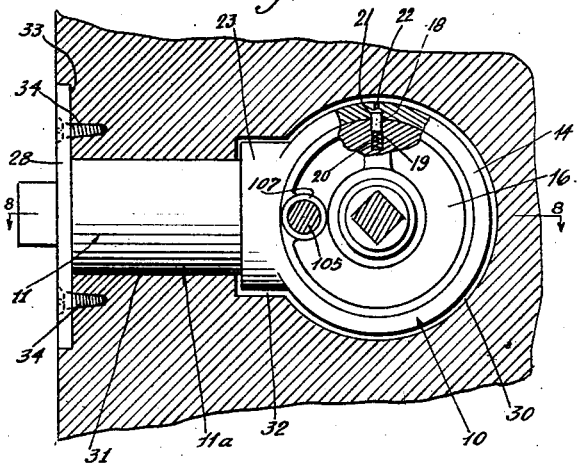
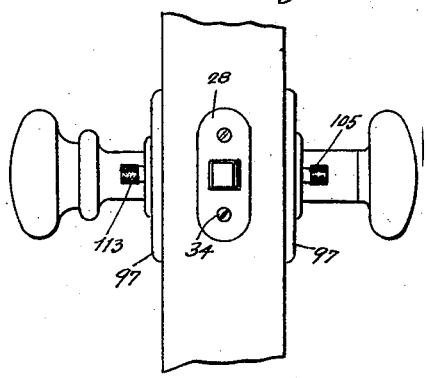
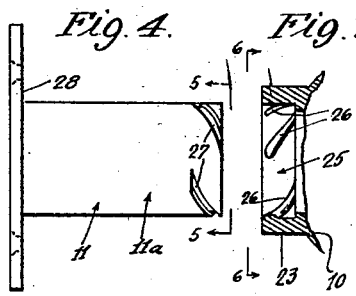
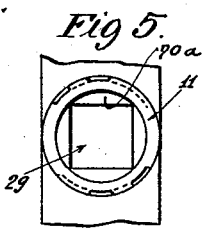
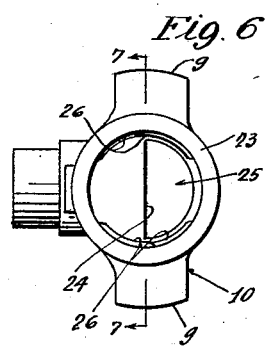
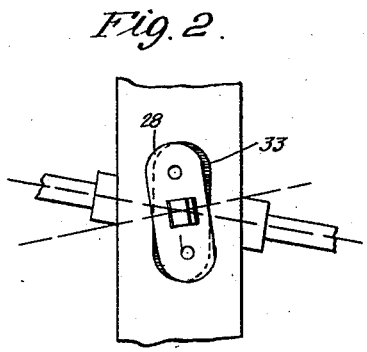
Inventors
Herman D. Schroeder
Frederick H. Koch
Attorney.

May 17, 1932. H. D. SCHROEDER ET AL 1,858,525
DOOR LATCH OR LOCK
Filed Sept. 11, 1928 7 Sheets-Sheet 2

Inventors
Herman D. Schroeder.
Frederick H. Koch.

Attorney.

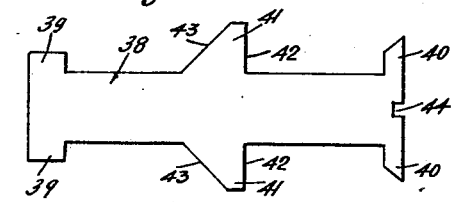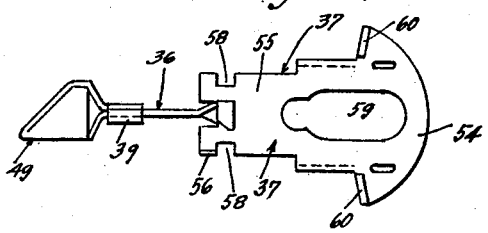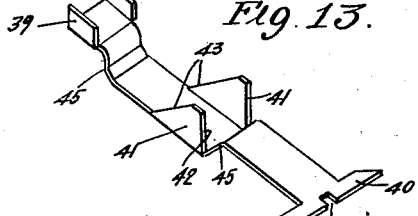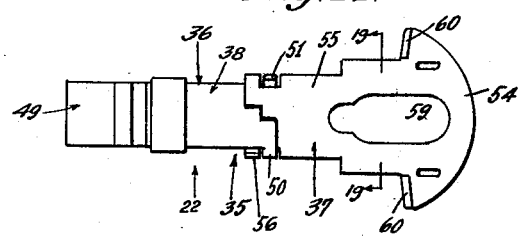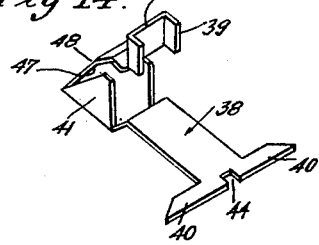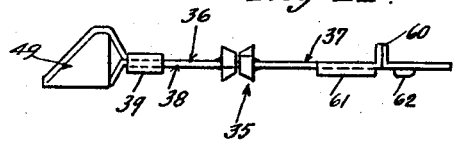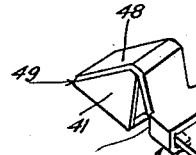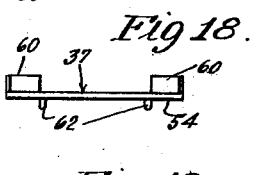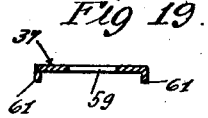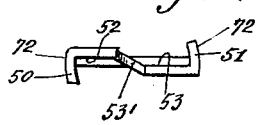

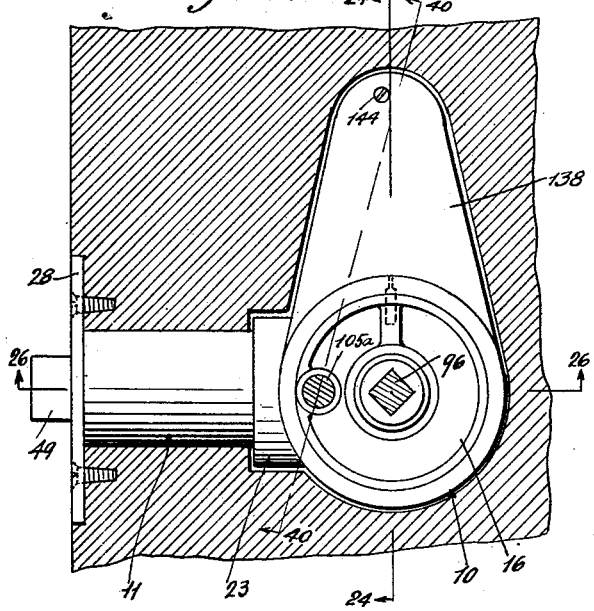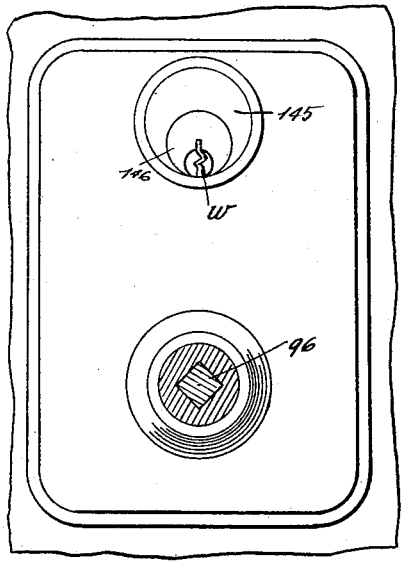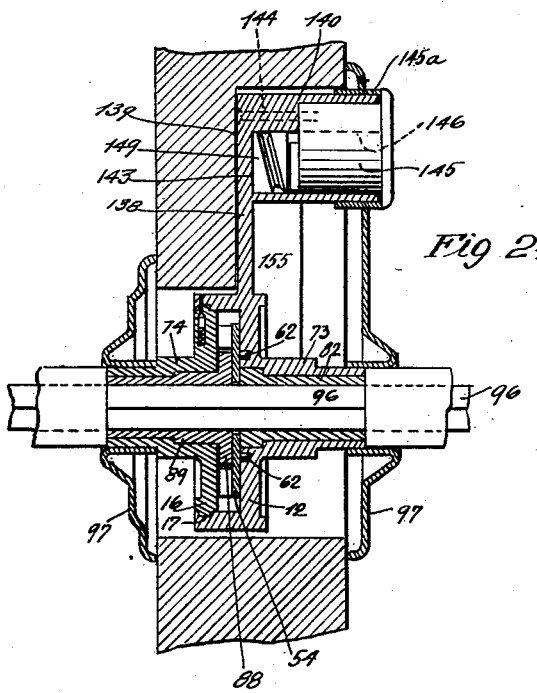

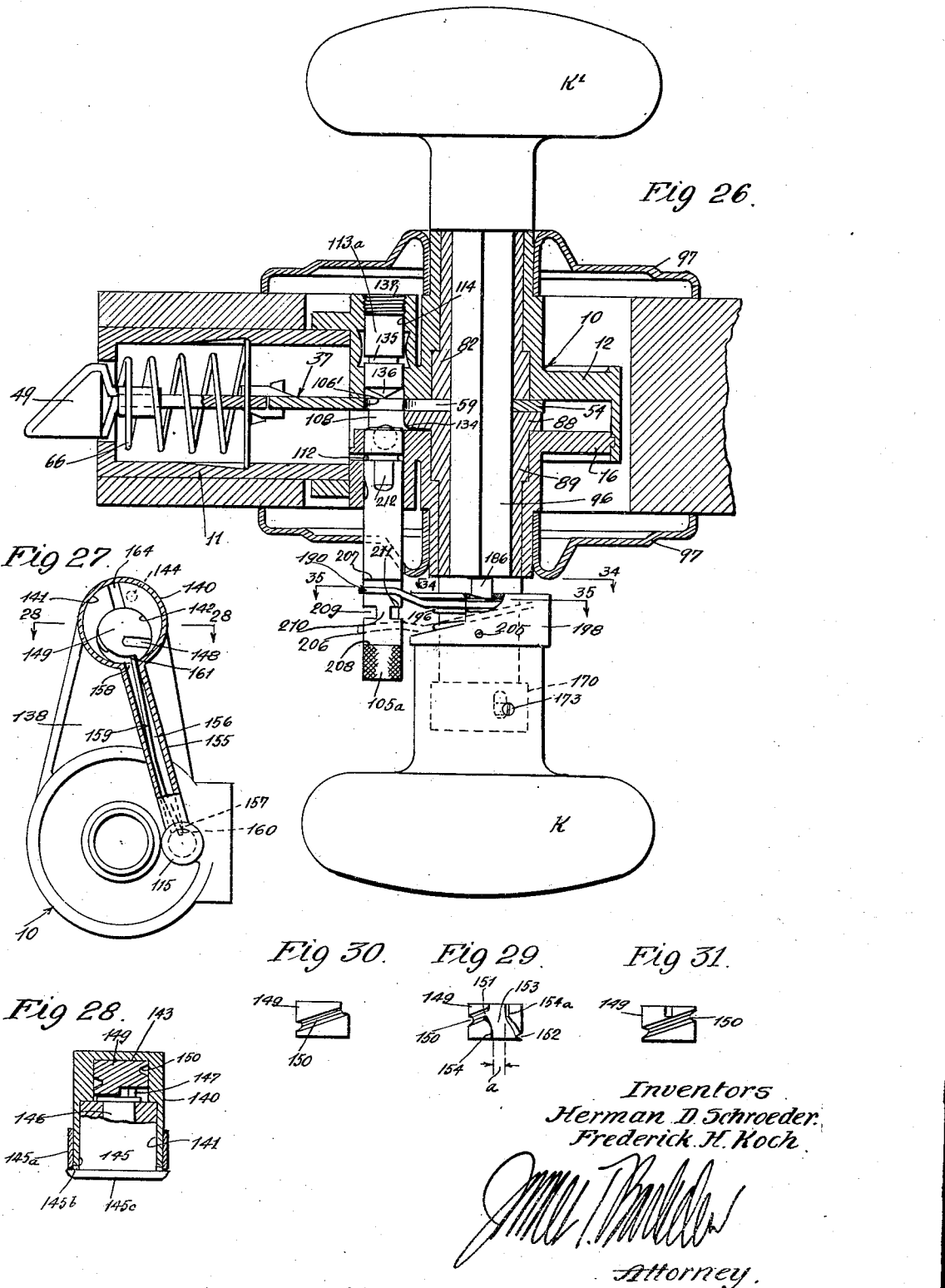

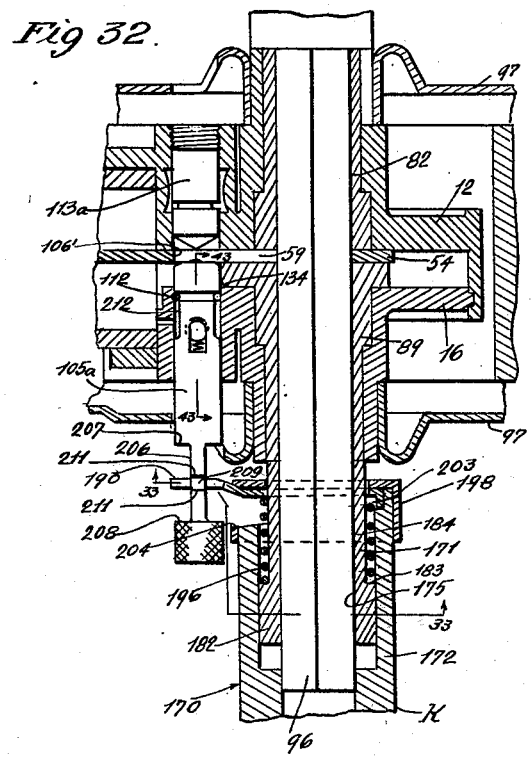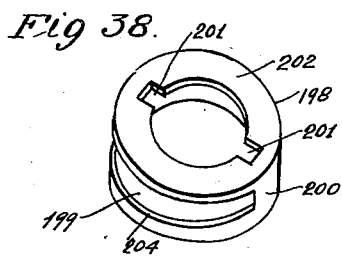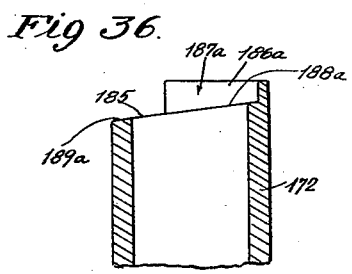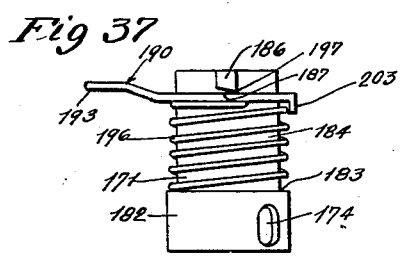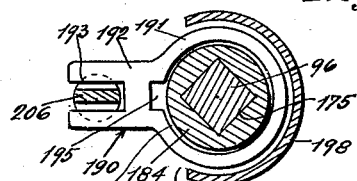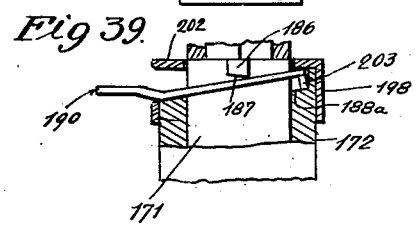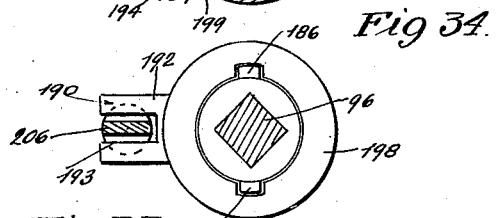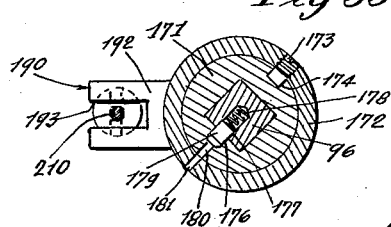

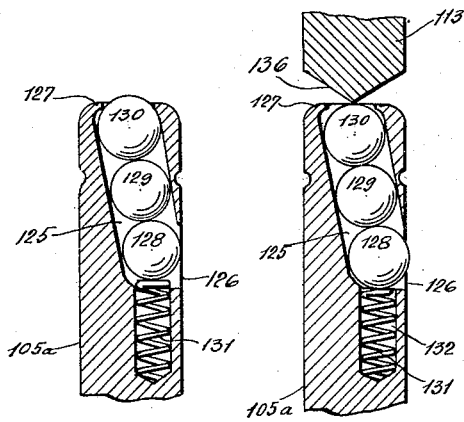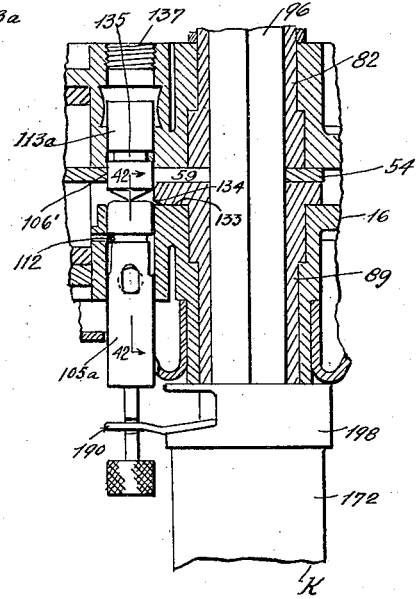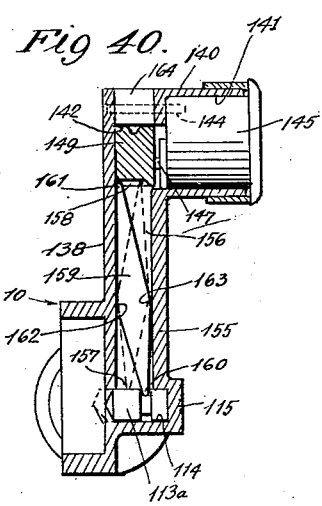

Patented May 17, 1932

1,858,525

UNITED STATES PATENT OFFICE

HERMAN D. SCHROEDER AND FREDERICK H. KOCH, OF LOS ANGELES, CALIFORNIA

DOOR LATCH OR LOCK

Application filed September 11, 1928. Serial No. 305,248.

This invention has to do generally with door latches or locks and is more particularly concerned, in certain of its aspects, with the type having separable, tubular latch bolt and spindle housings whereby the door may be prepared for the lock by drilling intersecting holes from the side and edge of the door. The many advantages arising from this arrangement are well known and therefore need not be discussed here.

The invention is of such a nature that its features and advantages may be discussed to much better advantage as the detailed specification progresses. It will suffice here to state that it may be considered as the general objects of the invention to provide an efficient, compact, relatively simple lock which may be manufactured and installed with minimum expense and labor, and yet have a variety of adjustments fitting it well to meet many different installation and locking problems.

Reference will be had to the accompanying drawings, in which:

Fig. 1 is a fragmentary sectional view taken through a door equipped with an embodiment of our invention;

Fig. 2 is an edge view of the door showing, in exaggeration the relative positions of the latch bolt and spindle housings during a step of their installation;

Fig. 3 is an edge elevation of the door after the latch has been fully installed;

Fig. 4 is a side elevation of the bolt housing detached from the spindle housing;

Fig. 5 is an end elevation of Fig. 4, as viewed from the right thereof;

Fig. 6 is a view of the spindle housing, looking in the direction of arrow 6 (Fig. 7) after the bolt housing has been detached;

Fig. 7 is a fragmentary section on line 7—7 of Fig. 6;

Figure 9:
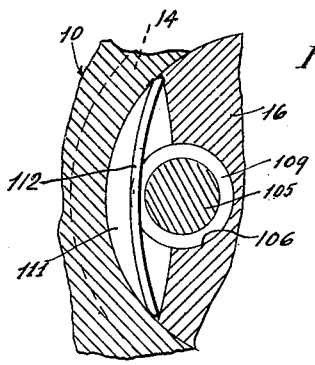
Fig. 9 is an enlarged, fragmentary section on line 9—9 of Fig. 8.

Figs. 12 to 15, inclusive, are views showing the formation of the bolt nose from a flat stamping;

Fig. 16 is an end elevation of the shank portion of the bolt nose;

Fig. 17 is a perspective view of the tail piece of the bolt;

Fig. 18 is an end elevation of Fig. 17, as viewed from the right thereof;

Fig. 19 is a section on line 19—19 of Fig. 17;

Figs. 20 and 21 show the method of detachably connecting the nose and tail piece of the bolt;

Fig. 22 is a view of Fig. 21 looking from the direction of arrow 22;

Fig. 23 is a view generally similar to Fig. 1 but showing the application of a key-control;

Fig. 24 is a section on line 24—24 of Fig. 23;

Fig. 25 is an elevation of Fig. 24, as viewed from the right thereof;

Fig. 26 is a section on line 26—26 of Fig. 23;

Fig. 27 is an elevation of the side of the lock opposite that shown in Fig. 23, the bolt housing and cylinder barrel being removed, and a portion of the housing for the locking lever being broken away to expose said lever;

Fig. 28 is an enlarged section on line 28—28 of Fig. 27;

Fig. 29 is a detailed elevation of the locking lever throw member;

Figs. 30 and 31 are elevations of Fig. 29 as viewed from the left and right, respectively, thereof;

Fig. 32 is a fragmentary view similar to a corresponding fragment of Fig. 26, but showing the manually controlled locking pin in different position, and showing the knob-controlled mechanism in section;

Fig. 33 is a section on line 33—33 of Fig. 32;

Fig. 34 is a section on line 34—34 of Fig. 26;

Fig. 35 is a section on line 35—35 of Fig. 26;

Fig. 36 is a medial section through the sleeve portion of the knob;

Fig. 37 is a detached view of the locking pin throwing assembly;

Fig. 38 is a perspective view of the knob sleeve cap;

Fig. 39 is a fragmentary view of the knob control, parts being shown in section, and illustrating the shifting of the locking pin actuating lever by moving the knob towards the door;

Fig. 40 is a section on line 40—40 of Fig. 23;

Fig. 41 is a view similar to Fig. 32 but showing the key-controlled and manually controlled locking pins in changed positions;

Fig. 42 is an enlarged fragmentary section on line 42—42 of Fig. 41; and

Fig. 43 is a view similar to Fig. 42 but showing the locking pins in changed position.

In the first place, there are certain structural features having to do with the latch bolt, bolt housing, spindle, throwing cam, and spindle housing which are novel in themselves and are adapted to be utilzed to advantage in connection with a variety of means for holding the latch bolt or the throwing cam releasably in certain positions. While the particular means here described, and which is novel in itself, is particularly effective and is particularly well adapted for interaction with the first named elements, it will be understood that the discussion of this particular means is not to be construed as in any way limiting such claims as do not call for such means specifically.

Starting with the first named elements only, the device can be considered as a spring latch to be used in situations where no occasion arises for locking the equipped door. By adding a single locking pin or dog, the device may be given the characteristics essential where it is desired to be able to lock the door from one side only. In the last named situation, it is sometimes essential that in case of emergency the device be unlocked from the normally dead side, and in this event an extra clearing pin is provided on said dead side whereby the dog may be thrust from operative position.

In other situations it is desirable that the means for locking or unlocking the door from one side thereof be under the control of a key, irrespective of the position to which the pin on the other side has been moved. It is also desirable, in some situations, that the manually controlled dog be capable of being put under direct control of the knob.

We have provided and shown means for meeting all the above situations, and in order to clarify the description we will discuss them in the order named. This progressive discussion, in spite of the fact that we will complete discussion of one phase before approaching the next, is not to be construed as in any way limitative on any of the phases.

As will later be made apparent, the latch bolt is of two-part construction, the nose part being carried by the bolt housing and the tail piece being carried by the spindle housing. The arrangements are such that by the single operation of rotating relatively the spindle and bolt housings, said housings are detachably coupled and put into proper relative position and at the same time the two parts of the latch bolt are coupled and put into operative position. For purposes of description, however, after describing the preparation of the door to receive the latch or lock, we will describe the two housings and their method of connection and then describe the two parts of the latch bolt and their connection. By then proceeding to a discussion of how the latch bolt parts are associated with their respective housing parts, it will be made clear how the single operation of relatively rotating the housing couples both said housings and the latch bolt parts. It will be understood, of course, that detachment of the housing and latch bolt parts is accomplished by a single reverse operation.

We have designated the spindle housing generally at 10 and the latch bolt housing generally at 11, each of which may be considered as of tubular formation. The central portion 12 of the housing 10 is cup-shaped, being made up of circular bottom plate 13 having an annular flange 14. The compartment 15, partially defined by this plate and flange 14, is further defined by removable cap or end plate 16, said cap having threaded connection 17 with the flange. The cap is releasably held to the flange in the following manner: A detent 18 is entered in a radial bore 19 which opens to the peripheral edge of plate 16, a spring 20 in this bore urging the detent radially outward. When the cap is rotated to engage the flange threadedly and has been moved to a position bringing its several parts in proper register with the associated parts of the body portion of the housing or elements within compartment 15, spring 20 urges detent 18 into the recess 21 which opens to the inner peripheral face of flange 14, thus locking the cap in proper position, that is, against rotation in either direction. When occasion arises for removing the cap a clearing tool may be inserted through the relatively small hole 22 in flange 14, said hole opening to recess 21 and giving access to the upper end of the detent so depression of the tool clears said detent from the recess and thus frees the cap for rotation.

Extending radially from flange 14 is a tubular boss 23 whose vertical axial plane is approximately coincident with the inner face 24 of plate 13, (Figs. 1 and 6) and half the bore 25 of this boss opens to the right of face 24 (as viewed in Fig. 6) which face defines the bottom of compartment 15. Bore 25 may be considered as a radial passageway opening from compartment 15. The bore defining face or boss 23 is provided with relatively rapid screw-threads 26 which are adapted to take complementary threads 27 on the end of the cylindrical, tubular bolt housing 11. The threads 26 and 27 are of such a character that relatively limited rotation of the bolt and spindle housings draws the spindle housing fully home, and the threads are further so prepared that when said housing is fully home the transverse flange or face plate 28 on the outer end of the bolt housing and the rectangular aperture 29 in said face plate are in proper alinement with respect to the spindle housing. In other words, when the bolt housing is threaded fully home there is no possibility of the transverse flange extending other than vertically, though it may be reversed top for bottom to bring the bevel on the latch bolt nose either towards one side of the door or the other, it later being made apparent how the latch bolt nose is held to the bolt housing.

In preparing the door for the latch a relatively large hole 30 is drilled through the door from face to face, and an intersecting hole 31 is drilled in from the edge of the door, the axes of the two bores being substantially at right angles. The door is cut away at 32 to accommodate boss 23 and the edge of the door is counter-cut as at 33 (Figs. 1 and 2) to accommodate face plate or flange 28. The bore 30 is of such diameter that housing 10 may be oscillated slightly through its vertical axial plane, such oscillation being utilized during the installation of the device as will be described. Reference will be had to Fig. 2 in discussing the assembly of the two housings, but it will be understood that this view shows an exaggerated condition in order to make several points clear. Housing 10 is thrust into bore 30 and canted to the position shown in Fig. 2. Preferably said housing is arcuate, as at 9 in Fig. 6, so it may be readily canted even though hole 30 is relatively tightly fitted thereby. Housing 11 is then entered from the edge of the door and threads 27 are engaged with threads 26. Holding the spindle housing stationary, the bolt housing is rotated and thus threadably drawn inwardly toward the edge of the door, until face plate 28 is in register with counter cut 33. The spindle housing is then rotated counterclockwise (Fig. 2) to horizontal position, the bolt housing being held against rotation; the face plate 28 thus being drawn directly into counter cut 33 and the barrel portion of the bolt housing being threaded home within boss 26. Screws 34 are then utilized to hold the bolt housing against subsequent displacement.

We will now describe our preferred type of latch bolt, its formation and the interconnection of its parts, without reference to the manner in which these parts are connected to associated portions of the device. We will designate the latch bolt as a whole by numeral 35, and it will be seen that it is made up of the nose portion 36 and tail piece 37, these portions being adapted for detachable connection during the assembly of the spindle and bolt housings, as will be later described.

The nose portion 36 is made up in a novel manner from a flat stamping, this being a feature making possible manufacture at minimum cost. The blank is shown in Fig. 12 and consists of an elongated body portion 38 having at its opposite ends offsets 39 and 40, and having central transverse extensions 41, the latter having square cut shoulders 42 facing offsets 40 and inclined shoulders 43 facing offsets 39. The right hand end (Fig. 12) is centrally notched as at 44.

The first forming operation presses the blank into the condition of Fig. 13, ears or offsets 39 and 41 being turned at right angles to the body portion and reverse bends 45 lifting the ends of the blank. The piece is then bent successively to the formations shown in Figs. 14 and 15, ears 39 being bent beneath body portion 38, which may now be called a shank, to hold end 46 closely to shank 38 and to hold the under side 47 of portion 48 against inclined shoulders 43, the inclined portion 48 thus forming the bevel of nose 49 and ears 41 forming the sides thereof.

Ears or offsets 40 are then bent to the positions clearly shown in Figs. 15 and 16, forming hooks 50 and 51 which open oppositely to the sides of shank 38. The material adjacent offsets 40 is pressed oppositely, and at opposite sides of notch 44, slightly out of the plane of shank 38 (Fig. 16), it following that between the under side 52 of hook 50 and the upper side 53 of hook 51 is defined a space 53' which is in the plane of shank 38.

Tail piece 37 is pressed and punched from flat stock and includes an arcuate cross-head portion 54 and a shank portion 55. The end of shank 55 is formed with hooks 56 and 57 which are bent oppositely from hooks 50, 51, respectively, and said hooks are offset oppositely from the plane of shank 55 in the same manner as described in connection with the hooks and shank of the nose portion. The sides of shank 55 are also notched as at 58 to take hooks 50, 51 when the nose portion and tail piece are coupled together as shown in Fig. 21. A central slot 59 extends longitudinally of shank 55, and cam lugs 60 are struck upwardly from arcuate portion 54 at opposite sides of the slot. Struck downwardly from shank 55 and arcuate portion 54 are lugs 61 and 62, respectively, these lugs serving to guide the tail piece in its movement, as will be later described.

In assembling the nose portion and tail piece, they are first held in the position of Fig. 20, that is, with their shank planes at right angles with one another and with the bottom face 63 of notch 44 and the bottom face 64 of notch 65 in engagement. This may be described as telescopic or longitudinally overlapping relation. The two pieces are then rotated relatively to bring their shank portions into coincident planes as illustrated in Figs. 21 and 22, hooks 50 and 51 engaging hooks 56 and 57, respectively, to prevent subsequent relative longitudinal movement of the pieces.

Nose portion 36 is adapted to reciprocate through the bore of the barrel portion 11a of housing 11, nose 49 being of rectangular cross-section and so fitting face plate aperture 29 that the entire nose portion is held against rotation. A coil spring 66 encircles shank 38, shouldering at one end 67 against the square shoulders 68 of nose 49 and having at its opposite end an enlarged coil 69 which engages frictionally the inner peripheral face of the housing and abuts against an annular shoulder 70 which faces toward the outer end of the housing. Spring 66 holds the bolt nose in assembly with the bolt housing when the latter is detached from the spindle housing and has a constant tendency to urge said nose to projected or operative position, though the forwardly facing shoulders 70', formed by the ends of bent over ears 39 (Fig. 15) engage shoulder 70a of the bolt housing to limit the extent to which said nose may be projected. This movement limiting means is utilized only when the bolt housing is detached from the spindle housing.

The width of shank 38, at hooks 50, 51, is substantially equal to the inside diameter of the bolt housing at the right (Fig. 8) of shoulder 70, and the outer faces 72 of said hooks (Fig. 16) are substantially complementary in curvature and in sliding engagement with the bore defining wall of said housing. It follows that the bolt shank is held properly centered within the housing, being nicely guided during its reciprocatory movement and being held from a tendency to move from the axial plane of the housing.

Extending oppositely from and concentrically with housing 12 are tubular hubs 73 and 74, hub 73 being integral with plate 12 and hub 74 being integral with cap 16. The hubs have terminals 75 of reduced diameter, while the hub bores are each of two diameters. For instance, hub 73 has bore 76 opening to the end thereof, while it is counterbored at 77 to provide an inwardly facing annular shoulder 78. Hub 74 has a bore 79 opening to the end thereof, and a counter bore 80 opening to compartment 15, there being an inwardly facing annular shoulder 81 formed at the function of the bores. Slipped into the bore of hub 73 from chamber 15 is a two diameter bushing 82, the relatively small portion 83 thereof and relatively large portion 84 thereof having nice running fit within bores 76 and 77, respectively. The annular shoulder 85 formed between the relatively large and small portions seats on shoulder 78, and the inner end of portion 84 is flush with face 24 of the spindle housing.

After the insertion of bushing 82, tail piece 37 is laid against face 24, slot 59 registering with the polygonal bore 86 of bushing 82, and guide lugs 61, 62 entering in grooves or guide ways 87 sunk in face 24 at opposite sides of counter bore 77 and extending longitudinally parallel to the axis of boss 23. Thrower cam 88, which will be described in detail later, preferably, though not necessarily, is integral with bushing 89 which has a relatively large diameter portion 90 fitted within counter bore 80, and a relatively small diameter portion 91 nicely and rotatively fitted within bore 79, the annular shoulder 92 formed at the junction of the larger and smaller diameters being engaged by hub shoulder 81 when cap 16 is in place. The cam is held by the inner face of said cap in engagement with the face of tail piece 37, though the engagement is sufficiently light to enable relative sliding movement between said tail piece and thrower cam. It will be noted that the tail piece is mounted for sliding reciprocation in the direction of the axis of boss 23, being guided in its movement by lugs 61, 62 in ways 87, said lugs being held in said ways by virtue of the imposition of the throwing cam upon the upper face of the tail piece.

When occasion arises for joining the bolt and spindle housings and consequently for joining the nose and tail piece portions of the bolt, the latch bolt housing is held with its end presented to the bore of boss 23 and with the plane of shank 38 at an angle to the plane of shank 37 of the tail piece, at which time threads 26 and 27 will be in a position ready for engagement. The nose portion of the cam is then thrust inwardly against the action of string 66 or the tail piece is moved forwardly to the limit established by contact of the left hand ends (Fig. 22) of lugs 61 with the left hand ends (Fig. 10) of ways 87, which results in such relative movement of the nose and tail piece portions that they are brought into the afore-described over-lapping relation, that is, with the bottoms 63 and 64 of notches 44 and 65 in engagement as illustrated in Fig. 20. By then rotating the bolt and spindle housings relatively about the axis of the bolt housing, said housings are threadably engaged and the two portions of the latch bolt are put into hooked engagement as illustrated in Figs. 21 and 22 to prevent subsequent relative longitudinal movement, all as described in connection with the elements in their detached conditions.

The parts are so relatively positioned and proportioned that, when the bolt housing is threaded fully home, the bolt parts are in full connection and the latch bolt may thereafter be considered as a single element mounted for reciprocation through the bolt housing.

With the parts in this condition, it will be noted that the latch bolt is now guided for longitudinal movement and held against lateral displacement throughout its extent, the nose portion being supported and guided as previously described while the hooked end of the tail piece, being arcuately formed similarly to the hooked end of the nose portion shank, is guided and supported within the bolt housing where the latter extends into boss 23. The shank 55 of the tail piece also has edge engagement with the bore defining wall of boss 23 to aid in guiding the tail piece through its reciprocation.

Figure 10:
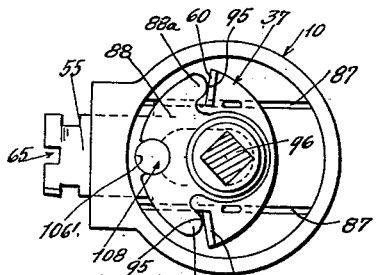
Fig. 10 is a detached view of the spindle housing as viewed from the direction of arrow 10 (Fig. 8) after the cover of said housing has been removed.
Figure 11:
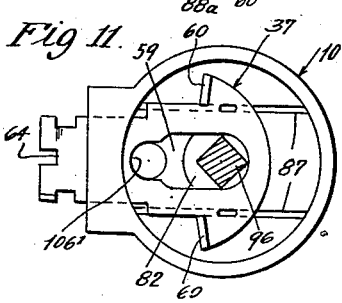
Fig. 11 is a view similar to Fig. 10, but with the throwing cam removed.

With the latch bolt parts thus connected, it will be seen that spring 66 is now effective to hold the assembled bolt yieldably in such position that nose 48 is projected beyond face plate 28, the tail piece occupying the position shown in Figs. 10 and 11. In this position, it will be seen that the arcuate end 54 of the tail piece is spaced from the right hand side (Fig. 10) of flange 14. Throwing cam 88 has arcuate characteristics, its throwing ends or cam noses 88a being rounded as indicated at 95 and in engagement with lugs 60 on tail piece 37. These lugs extend somewhat angularly with respect to the vertical axial plane (Fig. 10) of the spindle housing, giving them characteristics of inclination which in association with the rounded noses 95, conduce to smooth and efficient cam action. So also, the relatively great radially measured distance from the center of bushing 89 to each nose 88a gives the advantage of requiring relatively slight angular movement of the operating spindle 96 and the throwing cam to accomplish a relatively great travel of the latch bolt.

Operating spindle 96, of polygonal cross section, is entered endwise through bushings 82, 89 and slot 59. It will be apparent that rotation of said spindle in either direction from the position of Fig. 10, co-incidently rotates throwing cam 88 which, through co-action of either nose 95 with either lug 60, accomplishes a retraction of the latch bolt. Upon then releasing the spindle from manual pressure, spring 66 acts to return the bolt to the projected position of Fig. 8 and consequently, through tail piece lugs 60, to return the throwing cam 88 to the position of Fig. 10.

Escutcheon plates 97, of any suitable configuration, are fitted on the ends of the oppositely extending housing hubs 73 and 74. For instance, these escutcheon plates may be of circular formation, having their outer peripheral edges 98 bent over to engage the door faces and bent successively outward as at 98a and 99 to bring their center portions 100 appreciably spaced from the door faces, beyond which the reduced portions 75 of the housing hubs preferably also extend. The said central portion is pressed downwardly to form an internal flange 101 which defines the bore or central opening of the escutcheon plate and nicely engages the reduced portions of the housing hubs.

By then attaching the escutcheon plates to the door, as by screws 102, it will be seen that said plates hold the housing solidly in proper position of adjustment, forming end bearings for said housing and holding said housing from rotation about the axis of the bolt housing and therefore positively holding the latch bolt and spindle housings and the two parts of the bolt in proper, operative assembly.

Knobs K and K' may be detachably secured to the opposite ends of spindle 96 by any suitable means, as, for instance, set screws 103.

It will be understood, of course, that in the event an equipped door is swung shut without manual rotation of the operating spindle, nose 49 is cammed back against the action of spring 66 by engagement with the usual keeper plate (not shown) on the associated door frame (not shown). When the latch bolt is thus thrust inwardly, tail piece 37 merely slides beneath the throwing cam, the latter together with the operating spindle and its bushings remaining stationary. As soon as the bolt nose registers with the keeper plate aperture, spring 66 returns all parts of the latch to normal position.

As above described, the device has all the usual attributes of a normal latch with particular advantage lying in its structural characteristics whereby it is rendered easy and inexpensive to manufacture and install, particularly compact, relatively non-wearing and smoothly operable.

It is sometimes desirable that the device be equipped so the door may, in certain situations, be opened only from one side thereof. The means we employ for putting the device into this condition takes the form of a locking pin or dog adapted to be put into selected positions of adjustment, co-operating with the mechanism within the spindle housing in a manner to give any one of several results.

Figure 8:
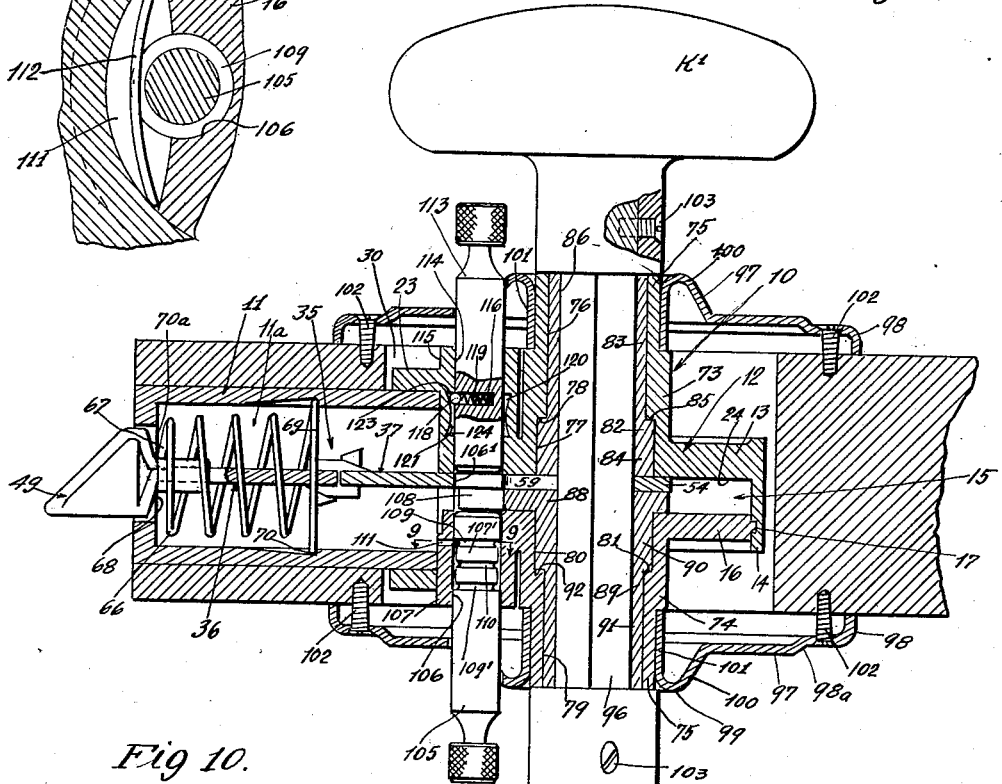
Fig. 8 is a section on line 8—8 of Fig. 1.

For instance, in Fig. 8, we have shown a manually operated locking pin or sliding dog 105 mounted for reciprocation through the bore 106 of hub 107 on cap 16, said bore being axially parallel to the spindle and opening to compartment 15, as clearly shown in Fig. 8. Bore 106 is in registration with notch 108 in throwing cam 88 and with slot 59 of tail piece 37 when said cam and tail piece are in the normal positions of Figs. 10 and 11, that is, when the bolt nose is fully projected. When the dog is in the position of Fig. 8 it in no way interferes with bolt reciprocation or cam rotaton. However, if it be thrust inwardly until it enters cam notch 108 but is still clear of the tail piece, it will be seen that it prevents rotation of the throwing cam and hence of the operating spindle and knobs in either direction, thus preventing bolt retraction through knob operation. However, the bolt is still "on the spring", so even though the throwing cam be locked against rotation the door may be swung shut and latched since the tail piece of the bolt is still free for reciprocation in either direction. Considering knob K' as being at the outside of the door or as the outside knob, it will be seen that with the door closed and the dog in this position, entrance cannot be had from the outside of the door, it requiring retraction of dog 105 before the bolt can be retracted through rotation of knob K' or, of course, of the inner knob K.

If the dog be thrust inwardly to such an extent that it passes through notch 108 and into slot 59, a "dead-lock" is accomplished. That is, not only are the throwing cam, spindle and knobs locked against rotation, but the dog enters behind the end wall 106' of slot 59, preventing the bolt from being thrust inwardly by end pressure exerted thereon. The circumstances under which it is desirable to effect this dead-locking and the advantages gained thereby are well known and therefore need not be discussed in detail.

It is preferable, of course, to provide releasable means for holding the dog 105 in any selected position to which it has been put. We have shown preferred means for accomplishing this, though it will be distinctly understood such means are not to be considered as in any way limitative on our broader claims. Thus we have shown the dog as having a portion 107' of reduced diameter at a point spaced inwardly from its locking end. At the opposite ends of this reduced portion are provided shallow grooves 109 and 109', while midway of the portion is provided a shallow groove 110. Grooves 109, 110 and 109' are so positioned that when the dog is in the position of Fig. 8, entered respectively in the throwing cam notch, or entered in both notch 108 and slot 59, they are in register with a transverse slot 111 in cap 16, this slot opening to the peripheral edge of the cap and also to the bore 106, as clearly shown in Fig. 9.

A short length of spring wire 112 is disposed within slot 111, being held by the bore defining wall of flange 14 against bodily displacement and so it extends across bore 106 at one side thereof. According to the position to which the dog had been thrust, spring 112 snaps into a corresponding groove in portion 107' and releasably holds the dog in adjusted position. The grooves are formed, of course, so that predetermined endwise pressure exerted against the locking pin clears the spring from the notches, as will be readily understood.

In certain situations it is desirable that a latch having the characteristics just above described, also have the capacity of being releasable from outside the door in the case of an emergency. For instance, in certain localities there are ordinances which insist that bath room doors be furnished with a latch which may always be released from the outside. We have therefore provided means, not ordinarily operated, whereby the dog 105 may be thrust to clear position from outside the door. However, assuming that the door be locked from the inside, notice is always given to those outside the door that it is locked by reason of the fact that the outside knob cannot be turned.

For this purpose, we have shown a clearing pin 113 extending through the bore 114 of boss 115 on plate 13. (When it is not desired to utilize a clearing pin, bore 114 is merely plugged up in any usual manner.) Bore 114 is in alinement with bore 106 and hence in alinement with slot 59 and notch 108. When the clearing pin is in the position of Fig. 8 it offers no interference to latch retraction or spindle movement. However, should dog 105 be thrust either to a position entering only notch 108 or to a position entering both said notch and slot 59, clearing pin 113 may be moved inwardly to thrust pin 105 to the clear position of Fig. 8. The clearing pin is then withdrawn to the position of Fig. 8 and the device is in fully unlocked condition.

The clearing pin may also be used for another purpose. Suppose that the occupant of the room desires to leave and yet give notice to those outside the room that no one is to enter during his absence. In such a case, after leaving the room and shutting the door the operator may thrust pin 113 inwardly to enter slot 59, alone, or to enter said slot and notch 108. The pin then has the same office as has pin 105 when the latter is in dead locking position, it following that one trying the outside knob finds that he cannot open the door. Of course, by retracting the clearing pin, access is given to the room, but the desired notice will have first been given.

It is desirable that when the clearing pin is used, releasable means be provided for holding it in its position of extension or retraction. For this purpose we have provided a transverse bore 116 through pin 113, said bore being closed at one end and carrying a spring and ball detent 118, 119, respectively, introduced through the other end of the bore. The ball is spring-urged into the annular recess 120 provided in bore 114, riding on the arcuate face 121 of the recess defining wall. By this simple arrangement, there are provided, in effect, notches 123 and 124 which are spaced to take ball 118 when the clearing pin is at opposite ends of its stroke. It will be evident that said detent in entering one or the other of the notches tends to hold the clearing pin in one or the other of its extreme positions, that is, fully cleared or fully projected, though a predetermined amount of force exerted endwise against the pin serves to clear the detent from the notches.

We now come to a situation where it is desirable that the lock be key-controlled, at least from one side of the door. As here illustrated, in Figs. 23 to 29, inclusive, we have shown the dog on the inside of the door, (corresponding to dog 105) as being manually operated, and the pin (corresponding to pin 113) operable from the opposite side of the lock as being key-controlled. The key-controlled dog is adapted either to lock the door from the outside or to clear the inside dog, while the inside dog not only serves as a locking member but also as a means for clearing the key-controlled pin. It will be understood, of course, that both dogs might be under individual key-control as regards their movement into and out of locking position, but it serves the purposes of description to show but one of the dogs under direct control of a key.

Those elements of the structure which are similar to ones previously described will be given the same reference numerals, except that we will here designate the inside dog as dog 105a, and the key-controlled dog as dog 113a. While it is obvious that dog 105a is under the control of the key applied to the outside of the lock as far as being moved to clear position is concerned, it is not movable to locking position by virtue of key operation. It therefore cannot be considered as being fully under the control of the key and we will hereinafter refer to it solely as a manually operated dog.

Referring particularly to Fig. 26, it will be noted that dog 105a is associated with certain elements on the knob. However, when said dog is in the position of this figure it is in no way affected by these knob-carried parts, except as to retention against rotation, and may, therefore, be considered as substantially a duplicate of dog 105 and as operable in the same manner: that is, it may be moved selectively from the clear position of Fig. 26 to an intermediate projected position where it enters notch 108 in the throwing cam to put the device on "spring latch", or it may be fully projected to extend into slot 59 in the tail piece to effect a "dead-bolt."

Spring 112 presses against the dog in a manner generally similar to that described in connection with Fig. 9 to hold it releasably in selected positions to which it has been adjusted. It will be later described in connection with the knob control shown in Figs. 26 and following, that when said knob control is effective, means is necessarily provided to hold dog 105a in the position shown in Fig. 41 after it has been thrust to such position by the key-controlled dog. While said holding means is not at all necessary to the present consideration since the knob control is not effective when in the condition of Fig. 26, we will now describe this holding means, as the absence of a view showing the dog without this means makes it necessary to consider its action in describing the clearing of said dog through the medium of the key-controlled mechanism.

Referring particularly to Figs. 42 and 43, dog 105a is shown as having a bore 125 which extends angularly with respect to the dog axis, opening at one end to the end of the dog and at the other end 126 to the side thereof. Confined within this bore by the overhanging flange 127, which gives rounded characteristics to the dog end, and the defining edge of aperture 126, is a series of balls 128, 129 and 130, these balls being provided in such number and of such diameter that they are capable of slight displacement longitudinally of the bore. A relatively weak spring 131 in communicating bore 132 tends to urge the balls forwardly and to retain them normally in the position of Fig. 43, at which time ball 128 does not project into aperture 126. It will be seen that even though the outermost ball projects somewhat beyond face 133 of cap 16 (Figs. 26 and 41), rotation of the throwing cam is not prevented, since said cam, as it is rotated, is capable of depressing the outermost ball as the defining edges of notch 108 strike said ball. Furthermore, and for a particular purpose to be described later, the declining edges of said notch, where they meet face 133, are bevelled or rounded as at 134.

Dog 113a is a relatively short one, having an annular groove 135 near its upper end and preferably having its lower end somewhat pointed as indicated at 136. The upper end of bore 114 is closed by plug 137. Extending radially from and integral with housing 10 is an arm 138, the door being recessed as at 139 (Fig. 24) to accommodate this extension. From the end of arm 138 and extending in parallelism with the operating spindle 96 and hence with dogs 105a and 113a, is a hub 140 which has a relatively large bore 141 opening outwardly, and a relatively small bore 142 opening at one end into bore 141 and closed at its opposite end 143. Bore 142 is eccentric with relation to bore 141, as is clearly indicated in Figs. 24 and 27. Releasably held within bore 141 by screw 144 is a usual lock barrel 145, containing a usual cylinder 146 adapted to be rotated by a fitting key, as is usual. A sleeve 145a, finished to suit the trim of the escutcheon plate, may be slipped over hub 140, its end flange 145b being clamped, by taking up screw 144, between the end of hub 140 and flange 145c of barrel 145 (Fig. 28). Cylinder 146 is in axial alinement with bore 142, and carries an eccentrically arranged driving lug 147 which is entered in the radially extending slot 148 sunk in the upper face of a cylindrical lever-throwing member 149, the latter being set for rotation within bore 142 and held against longitudinal movement between bottom 143 and the inner end of the lock cylinder.

The throwing member (Figs. 29, 30 and 31) is provided with a spiral groove 150 about its periphery, said groove opening at its opposite ends 151 and 152 to an angular, relatively wide clearing slot 153. The diagonally opposite defining edges 154 and 154a of slot 153 are square cut parallel to the axis of member 149 and thus form stop shoulders, as will hereinafter appear, but said shoulders 154, 154a are angularly spaced apart a distance a, that is, they are out of vertical alinement, as viewed in Fig. 29. The purpose of this spacing will be made apparent later.

Extending from hub 140 to boss 115 is a lever housing 155 which may be integral with said boss and arm 138. Housing 155 defines a relatively narrow, elongated compartment 156 which opens at one end 157 to bore 114 and at its opposite end 158 to bore 142. Disposed within this compartment is a lever 159 which is preferably of somewhat springy material and slightly bowed as indicated in Fig. 27 so it frictionally engages the side-defining walls of compartment 156 to hold the lever against undue freedom of movement. The lever is shaped as clearly shown in Fig. 40, being pointed at its opposite ends 160 and 161 and being adapted to rock or oscillate about its substantially medial points 162 and 163 where it engages with the top and bottom defining walls of compartment 156. The two extreme positions to which the lever may be rocked or oscillated are indicated by full and dotted lines in Fig. 40.

The lever is introduced to compartment 156 before barrel 145 and throwing member 149 have been inserted, the hub 140 having a slot 164 opening to bore 142 at a point diametrically opposite opening 158. The lever is moved endwise through openings 164 and 158 to the position shown in Fig. 40. The lever end 160 extends through opening 157 into grooves 135 in pin 113a while lever end 161 extends through opening 158 into slot 153 in member 149. The distance a (Fig. 29) is equal to the thickness, plus working clearance, of lever 159, it following that said lever may be oscillated without interference when the throwing member is in the position of Fig. 27, that is when the space measured by "a" is in register with opening 158, this for a purpose to be later described.

It may also be noted at this point that when the lever is in the position of Fig. 40, at which time dog 113a is fully retracted or clear of the latch bolt, end 161 lies alongside square shoulder 154, it following that member 149, and hence the key cylinder, can be rotated only in a clockwise direction, as viewed in Fig. 27. When lever 159 is moved to the dotted line position of Fig. 40, it lies alongside the square shoulder 154a and therefore prevents other than counterclockwise movement of the throwing member and key cylinder.

Movement of the lever from one position to the other to effect projection or retraction of dog 113a will now be described. In the first place, dog 105a will be disregarded for the time being. With a key entered in the usual key-way W (Fig. 25) of cylinder 146, to clear the usual tumblers (not shown) in the usual manner, cylinder 146 is rotated to cause, through coaction of lug 147 with the walls of slot 148, coincident rotation of throwing member 149 in a clockwise direction as viewed in Fig. 27. Lever end 161 is thus entered through opening 152 in the spiral groove 150 and continued rotation of said throwing member acts through the spiral to shift lever 159 to dotted line position in Fig. 40, as will be readily understood. It requires a 360° rotation of the key cylinder to accomplish this, therefore allowing withdrawal of the key at the end of the operation.

The described movement of the lever acts through end 160 to throw dog 113a into the projected position of Fig. 40, as indicated in dotted lines, the dog thus being moved through tail piece slot 59 and notch 108 to dead lock the latch bolt, as previously described in connection with the other dogs. Reverse rotation of the key cylinder is effective to return the parts to the various full line positions, that is to release the latch bolt for free movement under spindle operation or under end pressure from a usual keeper plate (not shown) on the associated door frame.

Now assume that dog 113a has been projected by virtue of key operation to lock the door, and occasion arises for unlocking the door from the inside. Dog 105a is thrust inwardly into end engagement with dog 113a, balls 128 to 130 compressing spring 131 so that the thrust of the dog 105a is transmitted through said balls to the point of dog 113a. A continued thrust of dog 105a moves dog 113a to clear position, for it will be seen that the space a allows the lever 159 to swing in the direction it is forced by the coaction between end 160 and dog 113a. With dog 113a thus fully retracted, dog 105a is withdrawn to inoperative or clear position and the device is then in unlocked condition. On the other hand, the throwing member 149 has not been moved by this lever movement and yet is in condition to receive subsequent movement under key actuation.

The purpose of angling slot or way 153 now becomes apparent. Were this slot to be square cut from top to bottom of member 149 and if in clearing dog 113a by an inward thrust of dog 105a the operator failed to return dog 113a to fully retracted position and consequently left lever end 161 at a point intermediate openings 151, 152, it will be seen that member 149 would be held by the lever against rotation in either direction under key actuation and the holder of the key would be unable to lock or unlock the door. By having the side walls of way 153 inclined, this condition is avoided; for even though lever end 161 be left intermediate openings 151, 152, rotation of member 149 is allowed through rotation of the key cylinder since said inclined walls then have camming action on lever end 161 to move it into register with either opening 152 or 151, depending upon the direction of rotation, and thus put the lever into such position that subsequent rotation of member 149 enters the lever end in spiral way 150.

Now assume that the door be locked from the inside by thrusting dog 113a into either notch 108 or through said notch into slot 59, and that it be desired to return the dog to inoperative position by means of a key applied to cylinder 146. As the key is turned to rotate cylinder 146 and member 149, dog 113a is projected through lever action, as described above. The point 136 of the dog first compresses spring 131 by rolling the balls through the inclined bore 125. By this action ball 128 is moved into registration with opening 126, but it does not interfere with inward movement of dog 105a, as a whole, which movement is accomplished by continued end thrust on dog 113a. The stroke of this last named dog is sufficient to move dog 105a to the position of Fig. 41, at which time the rounded end of dog 105a just projects above housing face 133. The key is then operated to retract dog 113a as described above.

Now the inward forcing of ball 128 forms a wedge lock between the dog and defining wall of bore 106 to hold dog 105a frictionally against subsequent movement to projected position, this being a provision made for taking care of a certain situation to be discussed later. However, assuming that it had been moved back to the position shown in Fig. 41, the spindle and the throwing cam may be rotated by either knob since at the initiation of this movement the rounded edge 134 of the cam engages the rounded end of dog 105a, and cams said dog completely out of the path of the throwing cam, this slight retractive movement of dog 105a freeing the ball from its wedge lock and allowing spring 131 to roll the balls forwardly.

Now referring to Figs. 26 to 43, inclusive, we will describe the means for putting dog 105a under control of the inner knob K. In this situation the dog is normally spring-held in a position to enter notch 108 in cam 88, though not entered in the tail piece slot. In other words, the device is normally held in such a condition that the spindle cannot be rotated from either knob without performing a dog-clearing operation, though the bolt is "on its spring" so it may be cammed by the keeper plate to retracted position when the door is swung closed. To enter from the outside of the door it therefore requires key actuation for each entry. The inner knob, however, is so fabricated and so connected with the inner dog that movement of said knob axially with respect to the spindle automatically clears the dog 113a from the throwing cam so the door may be opened by subsequent inner knob rotation. As a convenience, though this is not controlling on the invention, the parts are so arranged that axial movement of the knob in either direction accomplishes retraction of the dog 113a. The instant hand pressure is taken from the knob, said knob immediately returns to a position causing a re-entry of the dog to notch 108.

Knob K has a shank generally indicated at 170 which is made up of a bushing part 171 and a sleeve part 172, said parts being connected by a set screw or pin 173 which extends from part 172 into a closed ended axial slot 174 in part 171. The two parts are thus connected for limited relative longitudinal or axial movement but held against relative rotation, the extent of said relative axial movement being limited, for instance, by the length of slot 174. Bushing part 171 has bore 175 of polygonal cross section to take operating spindle 96, there opening into this bore a radially extending recess 176 which is adapted to register with a transverse bore 177 in spindle 96 when the bushing is positioned properly along the spindle. Within bore 177 is a spring 178 and a plunger detent 179. When bore 177 and recess 176 come into registration, spring 178 acts to project pin 179 partially into recess 176, thus locking bushing 171 against movement longitudinally along or axially with respect to the spindle. A small radial bore 180 in bushing 171 opens into recess 176 and registers with a radial bore 181 in a sleeve part 172. When occasion arises for detaching the knob from the spindle, a clearing tool is thrust through bores 181 and 180 to thrust detent or pin 179 into bore 177 and thus clear said pin from the bushing.

Slot 174 and recess 176 preferably are provided in the head or enlarged portion 182 of the bushing, there being formed an annular, end-facing shoulder 183 at the junction of head 182 and stem portion 184 of the bushing. The inner end of sleeve 172 is cut away as at 185 to leave a substantially semi-circular projection or rim 186a, this projection being counter-bored as at 187a to leave an end-facing shoulder 188a. Shoulder 188a inclines downwardly, as clearly shown in Fig. 36, this inclination extending clear across the sleeve so the end 189a of the cut-away part forms a continuation of shoulder 188.

At the end of stem 184 and at diametrically opposite sides thereof are integral fulcrum blocks 186, their lower faces 187 inclining oppositely and substantially equally to the inclination of shoulder 188a.

Throwing member or lever 190 is made up of a ring portion 191 and an arm portion 192, the latter being forked at its free end as at 193. Cut back from the bore 194 of ring 191, is a radial recess 195. By turning member 190 so that recess 195 is in register with one of the lugs or fulcrum blocks 186, tilting member 190 to bring its notched side below that lug, and then rotating the member until notch 195 is registered with the other lug and again tilting it to bring the member below said other lug, and then rotating the member until notch 195 is out of register with both lugs, member 190 is moved onto the stem 184 to a position beneath blocks 186. A coil spring 196 has first been slipped over the stem and into end engagement with shoulder 183, it following that said spring subsequently tends to hold member 190 in engagement with the points 197 of lugs 186.

A cap 198, having a side slot 199 in its flange portion 200 and diametrically opposite notches 201 in its end 202, is then slipped over the end of sleeve 172, slot 199 taking arm 192 and notches 201 taking blocks 186. In thus bringing the cap into assembly with the sleeve, it is not, of course, slipped directly on, it first being turned laterally to allow arm 192 to pass through the slot 199. The cap is drawn down until it engages the upper end of rim 186a, there being a depending toe 203 on ring 190 and diametrically opposite arm 192 which is brought into engagement with shoulder 188a, the upper face of the ring being normally engaged by the lower face of cap end 202. The lower defining wall 204 of slot 199 is flush with shoulder 189a, and the cap is fastened as by screws 205 to shell 172 in a manner to hold it and member 190 against upward displacement by spring 196, it being understood also that the points 187 of blocks 186 extend through notches 201 into engagement with the upper face of member 190.

Dog 105a has a flattened portion 206 which is terminally defined by shoulders 207 and 208 and is centrally notched at 209 to leave a stem 210. This flattened portion is adapted to be taken within the fork 193 of lever arm 192. When the dog is in the condition of Fig. 26 it will be seen that it is movable manually from clear position to lock either the cam 88 or the latch bolt as described above and without interference from the arm. Furthermore, when the dog is in the position of Fig. 26 the knob and spindle may be rotated without interference from arm 192 since sleeve 172 is capable of rotation with relation to member 190 due to the angular extent of slot 199, the rotation allowed by this slot being ample to allow full retraction of the bolt. When dog 105a is moved inwardly sufficiently to engage the throwing cam 88, that is, to enter fully notch 108 but not the latch bolt (see Fig. 32) notches 209 come into register with the arms of fork 193. Dog 105a is then rotated to the position of Fig. 32, it following that the shoulders 211 defining the opposite sides of notches 209 engage opposite sides of fork 193. The sides of dog 105a are flattened as at 212, spring 112 engaging these flats to resist yieldingly rotation of the dog from this last named position.

It will now be seen that the throwing cam and consequently the spindles and knobs are locked by dog 105a against rotation, though the bolt is still on the spring. Consequently it is impossible to retract the bolt by mere rotation of either knob. However, if the inner knob be thrust inwardly, that is, sleeve 172 be moved axially and inwardly over bushing part 171, toe 203 of member 190 is thrust upwardly and said member is fulcrumed about points 197 and swung to the position of Fig. 39 against the action of spring 196. The fork 193 is thus engaged with shoulders 211 and the dog 105a drawn from notch 108 to free the throwing cam and spindle for rotation, such rotation being accomplished without interference from member 190 due to the provision of slot 199 in cap 198.

As an alternative, the operator may draw knob K toward him in which case the end plate 202 of cap 198 presses upon the upper face of member 190 and draws said member bodily with it, the fork 193 thus acting against shoulder 211 to retract dog 105a from the throwing cam.

This thrust or pull on the knob to clear the dog does not take undesirable conscious effort as the operator naturally and normally either thrusts or pulls on the knob as he turns it, depending upon the direction in which the door opens.

Irrespective of whether the dog had been cleared by a push or pull on the knob, as soon as hand pressure is relieved therefrom, spring 196 returns sleeve 172 to the normal position of Figs. 26 and 32 and hence re-enters pin 105a in notch 108. It will thus be seen that though spring 196 is associated directly with the knob, it acts through member 190 as a means yieldingly holding the dog in engagement with the throwing cam.

It has been intimated above that dog 105a is manually moved to a position bringing notches 209 into alinement with fork 193 when it is desired to bring the knob control into play. However, it will be seen that longitudinal or axial movement of the knob will accomplish the same end. For instance, assume that pin 105a be in the clear position of Fig. 26. If it be desired to project it into the throwing cam so it may be subsequently turned into operative engagement with fork 193, the knob may be drawn straight back or pushed clear to its limits, bringing the fork into registration with notches 209, whereupon the pin may be turned to the position of Fig. 32. Upon then releasing the knob, spring 196 returns the member 190 to normal position, said member acting upon the dog to engage it with the throwing cam.

On the other hand, assume that the pin has been thrown through both the throwing cam and latch bolt, at which time shoulder 208 will be in engagement with the fork arms. A push or pull on the knob then actuates member 190 to withdraw the dog from the bolt but leaves said pin in notch 108. When the knob is released fork 193 will be found in register with notches 209 and the pin may be turned to the position of Fig. 32.

Should dog 113a have been moved by the key into locking position and it becomes desirable to unlock the door from the inside, it is only necessary to rotate pin 105a from the position of Fig. 32 until its flat 206 lies in the fork slot and then thrust it inwardly to clear pin 113a from the throwing cam and latch bolt, as described above, pin 105a being subsequently retracted to free the cam and bolt for movement.

Should it be desired to unlock the door from the outside, with pin 105a in its spring held position of Fig. 32, the dog 113a is projected through key actuation as described above and pin 105a thus thrust back. Ball 128 will be wedged into locking engagement as described above and the rounded nose, only, of pin 105a, will project above face 133. Slight rotation of the spindle and throwing cam acts through rounded edge 134 to thrust the dog 105a inward sufficiently to clear ball 128 from wedging engagement, as previously described, but by the time this is accomplished the throwing cam has passed sufficiently over the end of the pin to hold it from re-entering notch 108, it following that the cam may be rotated through the inner or outer spindle to retract the latch. The instant the throwing cam returns to normal position, spring 196 acts through arm 192 to return the dog to the position of Fig. 32, spring 131 having returned the clutch balls to inoperative positions.

It will be understood the drawings and description are to be considered merely as illustrative of and not restrictive on the broader claims appended hereto, for various changes in design, structure and arrangement may be made without departing from the spirit and scope of said claims.

We claim:

1. In a device of the character described, a two-part latch bolt, the parts being arranged end to end, and inter-engaging hook means on the two parts adapted to put them into detachable connection by virtue of relative rotation of said parts about their longitudinal axis.

2. In a device of the character described, a tubular spindle housing, a tubular latch bolt housing adapted to extend radially from the spindle housing, a latch bolt nose mounted in the bolt housing for reciprocation therethrough and held against rotation therein, a tail piece mounted in the spindle housing for reciprocation therethrough and held against rotation therein, and means on the bolt housing and means on the nose adapted to engage respectively the spindle housing and tail piece by virtue of relative rotation of the two housings about the bolt housing axis to hold said housings releasably together and to hold said nose and tail piece in detachable connection.

3. In a device of the character described, a tubular spindle housing having a radial passageway opening to the bore thereof, there being a flat surface in the housing which is substantially in an axial plane of said passageway, a tail piece embodying a flat plate having a cross-head portion and a shank portion, the head portion being in sliding engagement with said surface and the shank portion extending into said passageway, and coacting means in said spindle housing and on said tail piece guiding the tail-piece in a direction parallel to the passageway axis during its sliding movement.

4. In a device of the character described, a tubular spindle housing having a radial passageway opening to the bore thereof, there being a flat surface in the housing which is substantially in an axial plane of said passageway, a tail-piece embodying a flat plate having a cross-head portion and a shank portion, the head portion being in sliding engagement with said surface and the shank portion extending into said passageway, said tail piece being confined to sliding movement in a direction parallel to the axis of the passageway, an operating spindle journaled in the housing and extending at right angles to the tail piece and through a slot therein, said slot extending longitudinally in the direction of tail piece movement, a pair of lugs extending from the tail piece away from said surface, said lugs being one at each side of said slot, and a throwing cam mounted for rotation with said spindle and having a pair of cam noses in engagement, one each, with said lugs.

5. In a device of the character described, a tubular spindle housing, a radially extending bolt housing, a latch bolt mounted in the bolt housing for reciprocation therethrough to and from projected position, an operating spindle journaled in the spindle housing, a throwing cam on said spindle and having cam engagement with the bolt, said cam being operable by spindle rotation to retract the bolt from projected position, and a dog mounted in the spindle housing for reciprocation parallel to the spindle, said dog being movable, when said bolt is projected, into engagement with the cam to hold it from rotation.

6. In a device of the character described, a tubular spindle housing, a radially extending bolt housing, a latch bolt mounted in the bolt housing for reciprocation therethrough to and from projected position, an operating spindle journaled in the spindle housing, a throwing cam on said spindle and having cam engagement with the bolt, said cam being operable by spindle rotation to retract the bolt from projected position, and a dog mounted in the spindle housing for reciprocation parallel to the spindle, said dog being movable selectively, when said bolt is projected, into engagement with the cam to hold it from rotation and into engagement both with the cam and the latch bolt to hold said bolt from retractive movement.

7. In a device of the character described, a tubular spindle housing, a radially extending bolt housing, a latch bolt mounted in the bolt housing for reciprocation therethrough to and from projected position, an operating spindle journaled in the spindle housing, a throwing cam on said spindle and having cam engagement with the bolt, said cam being operable by spindle rotation to retract the bolt from projected position, a dog mounted at one side of the spindle housing for reciprocation parallel to the spindle, said dog being movable, when said bolt is projected, into engagement with the cam to hold it from rotation, and a dog mounted at the opposite side of the spindle housing and movable to clear the dog from engagement with the cam.

8. In a device of the character described, a tubular spindle housing, a radially extending bolt housing, a latch bolt mounted in the bolt housing for reciprocation therethrough to and from projected position, an operating spindle journaled in the spindle housing, a throwing cam on said spindle and having cam engagement with the bolt, said cam being operable by spindle rotation to retract the bolt from projected position, a dog mounted at one side of the spindle housing for reciprocation parallel to the spindle, said dog being movable, when said bolt is projected, into engagement with the cam to hold it from rotation, and a key-controlled pin mounted at the opposite side of the spindle housing and movable to clear the dog from engagement with the cam.

9. In a device of the character described, a spindle housing, an operating spindle journaled in the housing, a latch bolt mounted for reciprocation in a direction at right angles to the spindle axis to and from projected position, a throwing cam on said spindle and having engagement with the bolt whereby spindle rotation effects retraction of the bolt, and a dog mounted in the spindle housing for movement, when the bolt is extended, into a position to hold the spindle from rotation, a knob on the spindle and movable axially with respect thereto, and means interconnecting the knob and dog whereby axial movement of the knob in either direction retracts the dog from such holding position.

10. In a device of the character described, a spindle housing, an operating spindle journaled in the housing, a latch bolt mounted for reciprocation in a direction at right angles to the spindle axis to and from projected position, a throwing cam on said spindle and having engagement with the bolt whereby spindle rotation effects retraction of the bolt, and a dog mounted in the spindle housing for movement, when the bolt is extended, into a position to hold the spindle from rotation, a knob on the spindle and movable axially with respect thereto, spring means yieldingly maintaining said dog in holding position, and means interconnecting the knob and dog whereby axial movement of the knob in one direction retracts the dog from such holding position.

11. In a device of the character described, a spindle housing, an operating spindle journaled in the housing, a latch bolt mounted for reciprocation in a direction at right angles to the spindle axis to and from projected position, a throwing cam on said spindle and having engagement with the bolt whereby spindle rotation effects retraction of the bolt, and a dog mounted in the spindle housing for movement, when the bolt is extended, into a position to hold the spindle from rotation, a knob on the spindle and movable axially with respect thereto, spring means yieldingly maintaining said dog in holding position, and means interconnecting the knob and dog whereby axial movement of the knob in either direction retracts the dog from such holding position.

12. In a device of the character described, a spindle housing, an operating spindle journaled in the housing, a latch bolt mounted for reciprocation in a direction at right angles to the spindle axis to and from projected position, a throwing cam on said spindle and having engagement with the bolt whereby spindle rotation effects retraction of the bolt, and a dog mounted in the spindle housing for movement, when the bolt is extended, into a position to hold the spindle from rotation, a knob on the spindle and movable axially with respect thereto, spring means acting on the knob and yieldingly maintaining said dog in holding position, and means interconnecting the knob and dog whereby axial movement of the knob in one direction retracts the dog from such holding position.

13. In a device of the character described, a spindle housing, an operating spindle journaled in the housing, a latch bolt mounted for reciprocation in a direction at right angles to the spindle axis to and from projected position, a throwing cam on said spindle and having engagement with the bolt whereby spindle rotation effects retraction of the bolt, and a dog mounted in the spindle housing for movement, when the bolt is extended, into a position to hold the spindle from rotation, a knob on the spindle and movable axially with respect thereto, spring means yieldingly maintaining said dog in holding position, and key controlled means for retracting said dog from holding position against the action of the spring.

14. In a device of the character described, a spindle housing, an operating spindle journaled in the housing, a latch bolt mounted for reciprocation in a direction at right angles to the spindle axis to and from projected position, a throwing cam on said spindle and having engagement with the bolt whereby spindle rotation effects retraction of the bolt, and a dog mounted in the spindle housing for movement, when the bolt is extended, into a position to hold the spindle from rotation, a knob on the spindle and movable axially with respect thereto, spring means yieldingly maintaining said dog in holding position, key controlled means for retracting said dog from holding position against the action of the spring, and means operated by said key controlled means to hold said dog in retracted position against the action of the spring means after said key controlled means has been moved from dog retracting position.

In witness that we claim the foregoing we have hereunto subscribed our names this 24th day of July, 1928.

HERMAN D. SCHROEDER.
FREDERICK H. KOCH.